United States Patent
Brevetti et al.

(10) Patent No.: US 6,831,426 B2
(45) Date of Patent: Dec. 14, 2004

(54) ELECTRONIC DEVICE, OR DIMMER, FOR REGULATING THE POWER SUPPLY APPLIED TO A LOAD

(75) Inventors: Paolo Brevetti, Albano Laziale (IT); Fabio De Sisti, Albano Laziale (IT); Andrea Torni, Albano Laziale (IT)

(73) Assignee: De Sisti Lighting S.p.A., Albano Laziale (IT)

( * ) Notice: Subject to any disclaimer, the term of this patent is extended or adjusted under 35 U.S.C. 154(b) by 0 days.

(21) Appl. No.: 10/338,732

(22) Filed: Jan. 9, 2003

(65) Prior Publication Data

US 2003/0168996 A1 Sep. 11, 2003

(30) Foreign Application Priority Data

Mar. 6, 2002 (IT) ..................... RM2002A0124

(51) Int. Cl.[7] .................................. G05F 1/00
(52) U.S. Cl. .............. 315/291; 315/307; 315/209 R; 315/219; 315/224; 315/DIG. 4
(58) Field of Search ................. 315/291, 307, 315/219, 224, 209 R, 247, DIG. 4, 308, DIG. 7; 307/26, 27, 28; 363/98, 132

(56) References Cited

U.S. PATENT DOCUMENTS

| | | | |
|---|---|---|---|
| 5,416,387 A | * | 5/1995 | Cuk et al. ............... 315/209 R |
| 5,747,943 A | * | 5/1998 | Houk et al. ................. 315/225 |
| 5,932,934 A | * | 8/1999 | Hofstetter et al. ............ 307/26 |
| 6,002,213 A | * | 12/1999 | Wood .......................... 315/307 |
| 6,031,749 A | * | 2/2000 | Covington et al. ............ 363/98 |
| 6,121,734 A | * | 9/2000 | Szabados ..................... 315/291 |

\* cited by examiner

Primary Examiner—Don Wong
Assistant Examiner—Chuc Tran
(74) Attorney, Agent, or Firm—Arent Fox, PLLC.

(57) ABSTRACT

The invention concerns an electronic device, or dimmer, for regulating the power supply applied to a load (4), the device comprising an insulated gate bipolar transistor or IGBT (1), the IGBT (1) having a first operating mode in which it is off and does not allow any current to pass, a second operating mode in which it is on and the current passing therein is substantially limited by characteristics of an external circuit connected to it, and a third linear region operating mode, in which the current passing therein is limited by a value proportional to the gate voltage, the IGBT (1) being connected to a rectifier bridge (2), apt to be connected to a load (4) and to a mains (5) connected in series to each other, the device further comprising a processing and controlling unit, the device being characterised in that said processing and controlling unit includes digital processing means (6, 7) and in that the device comprises ramp generating means (17, 18) driven by said processing and controlling unit, apt to generate a ramp voltage signal at an output terminal connected to the IGBT gate, so as to drive the IGBT (1) in linear region.

The invention further concerns a system for controlling and regulating the power supply applied to a plurality of loads (4), comprising one of such dimmers for each one of the loads of said plurality.

31 Claims, 2 Drawing Sheets

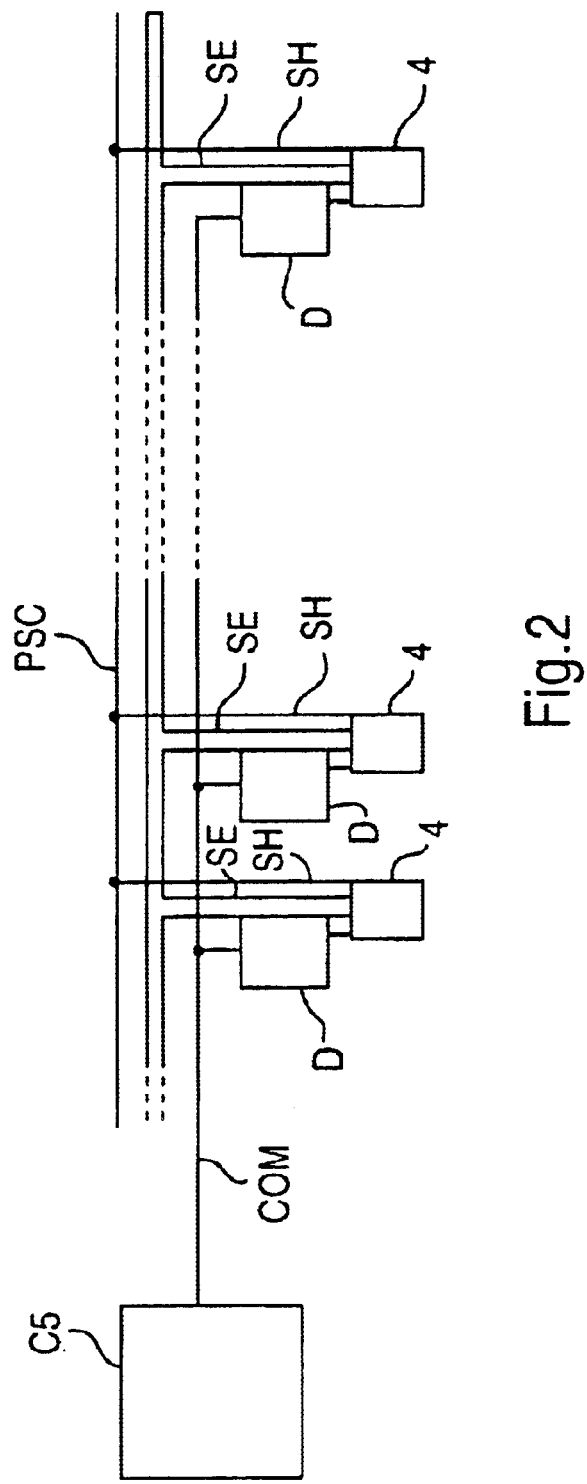

ELECTRONIC DEVICE, OR DIMMER, FOR REGULATING THE POWER SUPPLY APPLIED TO A LOAD

FIELD OF THE INVENTION

The present invention concerns an electronic device, or dimmer, for regulating the power supply. Specifically, said dimmer makes possible, in a simple, reliable, effective, and acoustically noiseless way, to supply loads, in particular lighting power devices, such as filament lamps, for motion picture, television, and theatre applications.

The present invention further concerns a system for controlling and regulating the power supply applied to a plurality of loads, comprising such dimmers.

BACKGROUND OF THE INVENTION

A dimmer is an electronic device capable to control alternate voltage applied to a load, generally a filament lamp, through delivering a selected portion of the mains sinusoid by means of an electronic power switch. In particular, when the power supply is decoupled from the load at the beginning of each half-cycle of the mains sinusoid, the dimmer applies to the load a waveform named forward phase control or FPC, having very steep power up fronts and sinusoidal power down. Conversely, when the power supply is coupled to the load at the beginning of each half-cycle of the mains sinusoid, the dimmer applies to the load a waveform named reverse phase control or RPC, having sinusoidal power up and very steep power down fronts.

After the development of the first power solid state electronic devices, which assure a controlling capability better than valves, dimmers have been developed employing devices know as triacs, or bidirectional thyristors, operating as electronic switches; such triacs comprise two controlled rectifiers, or SCR, connected in antiparallel configuration. A triac may be turned on in any moment, and it turns off only when the current becomes smaller than a minimum conduction value.

Due to such characteristics, said dimmers operate according to the FPC control. Since very steep leading edges are harmful for the lamp filaments, besides producing both electrical and acoustic noise, in order to slow the leading edges down, said dimmers are provided with large inductors, which assure high efficiency and great circuit simplicity.

However, such dimmers have the drawback to be very expensive and still very noisy.

In recent years, dimmers have been developed employing as electronic switches, power solid state devices known as insulated gate bipolar transistors, or IGBTs. With respect to triacs, IGBTs offer the advantage to be able to be controlled for turning on and off, and to be able to operate also in linear region and to be progressively turned off.

In particular, U.S. Pat. No. 5,004,969 discloses a phase control power switching circuit having a couple of IGBTs, connected in reverse series configuration between a load and alternate current source, for controlling the current flow through the load. The two IGBTs are alternatively driven through commutating means such a way that each IGBT alternatively operates between conduction and interdiction at the desired phase angle of the current flow. In particular, such a circuit, which is usable as a dimmer, is based on the interaction of a constant frequency source, a flip-flop, and a delay circuit.

However, the dimmer disclosed in U.S. Pat. No. 5,004,969, which is described as operating according to the RPC control, has some drawbacks.

First of all, it is not capable to regulate the descent slope of the power down fronts of the RPC waveform applied to the load (similarly, it would not be capable to regulate the rise slope of the power up fronts of FPC waveform). This produces quicker power down times for lower values of current delivered to the load, and, hence, it makes complex to select the desired phase angle in order to control the power up times of the load lamps.

Moreover, efficiency is smaller, the dimmer suffers from a high circuit complexity and is acoustically rather noisy.

U.S. Pat. No. 5,239,255 discloses a phase controlled power modulation system which again employs a couple of IGBTs, connected in reverse series configuration between a load and an alternate current source, for modulating the power supply applied to the load. The two IGBTs are driven by a transition shaper that controls the rate of change of the voltage applied to the load. The dimmer further comprises a phase controller, for controlling the transition shaper, a device for protecting the IGBTs, and an asymmetric waveform selector. The dimmer may operate according to the FPC control, according to the RPC control, or, by means of the asymmetric waveform selector, according to an asymmetric hybrid control, wherein the power delivered to the load during the first half-cycle of the supply alternate current is different from the power delivered during the second half-cycle.

However, also the dimmer disclosed in U.S. Pat. No. 5,239,255 has some drawbacks.

First of all, in case overload conditions occur, due for example to a situation of cold lamp, the filament of which has a resistance about ten times lower than the one of the filament at operative temperature, transition shaper voltage control does not detect conditions of excessive current delivered to the load. Therefore, monitoring of possible overload conditions is carried out by the protecting device which indirectly operates on the shaper through the asymmetric waveform selector, making the dimmer circuit extremely complex. Moreover, despite of such circuit complexity, the dimmer is not much versatile, since the slope of both power up and power down fronts may be selected among very few values predetermined by the circuit components.

Consequently, the dimmer is also expensive and not completely effective.

Furthermore, it is still acoustically noisy under overload conditions.

Other dimmers, which are presently available on the market, comprise an IGBT and a rectifier bridge, or two IGBTs with reverse conducting diode. Such dimmers have RPC operating characteristics, wherein the descent time of the power down front is limited by IGBT dissipation. Time of about 500 microseconds may be obtained under reasonable dissipation. Also, such dimmers may similarly operate according to FPC operating mode.

Even offering some advantages, such as sinusoidal leading edges having reduced noise and trailing edges having variable slope obtained without using expensive large inductors, these last dimmers still have the drawbacks of having a low efficiency and a considerable circuit complexity, and of being excessively noisy for applications to show environments.

Acoustic and electrical noise of presently available dimmers forces to place all dimmers far away from the supplied lamps which are used in show environments, preferably within a dedicated room which is far and acoustically insulated from the show room where the lighting devices supplied by the same dimmers are mounted. This causes the presence of a lot of cables in the room to be lighted in all the cases where a multiplicity of lamps is needed, as it happens in television or motion picture studios, or in theatre stages, producing high cost of the electric installation. Moreover, currents with high harmonic content pass through the cables, causing cross talks and interference among the various circuits.

SUMMARY OF THE INVENTION

It is therefore an object of the present invention to provide an electronic device, or dimmer, for regulating the power supply applied to a load, which is both acoustically and electrically noiseless during supplying operations of power loads, in particular lighting power devices.

It is still object of the present invention to provide such an electronic device which make possible, in a reliable and effective way, to regulate the rise slope of the power up fronts and the descent slope of the power down fronts of the power waveforms applied to the load.

It is another object of the present invention to provide such a device which has a high efficiency and a great circuit simplicity, consequently being simple to be realised and having cost at least comparable to the cost of conventional dimmers.

It is specific subject matter of this invention an electronic device, or dimmer, for regulating the power supply applied to a load, the device comprising an insulated gate bipolar transistor or IGBT, the IGBT having a first operating mode in which it is off and does not allow any current to pass, a second operating mode in which it is on and the current passing therein is substantially limited by characteristics of an external circuit connected to it, and a third linear region operating mode, in which the current passing therein is limited by a value proportional to the gate voltage, the IGBT being connected to a rectifier bridge, apt to be connected to a load and to a mains connected in series to each other, the device further comprising a processing and controlling unit, the device being characterised in that said processing and controlling unit includes digital processing means and in that the device comprises ramp generating means driven by said processing and controlling unit, apt to generate a ramp voltage signal at an output terminal connected to the IGBT gate, so as to drive the IGBT in linear region.

It is obvious to provide that other embodiments of the device according to the invention have a processing and controlling unit driving more ramp generating means, each one of which drives in turn one or more IGBT, each connected to a corresponding load through a rectifier bridge.

Preferably according to the invention, said ramp generating means comprises a Digital to Analogue (or D/A) converter, driven by said digital processing means, the D/A converter having an output connected to the not inverting input of a differential amplifier, the inverting input of which is connected to an amperometric transformer, in turn connected in series to the IGBT, the inverting input of the differential amplifier receiving from the amperometric transformer a voltage signal proportional to the current passing into the IGBT, an output of the differential amplifier being connected to the IGBT gate.

Always according to the invention, said ramp generating means may comprise one or more stages for amplifying and/or stabilising the signal generated at said output of the D/A converter.

Still according to the invention, said processing and controlling unit may be connected to the amperometric transformer in such a way to receive a voltage signal proportional to the current passing into the IGBT.

Further according to the invention, the device may include power up means and power down means, controlled by said processing and controlling unit, connected to the IGBT gate and apt to turn on and off, respectively, the IGBT.

Preferably according to the invention, said power up means includes a p-n-p transistor and said power down means includes a n-p-n transistor.

Always according to the invention, the device may comprise IGBT protection switching means, connected between the IGBT gate and a circuit ground, apt to take on an open configuration, in which the IGBT gate is apt to be driven by said ramp generating means, or a closed configuration, in which the IGBT gate is connected to circuit ground.

Still according to the invention, the configuration taken by said switching means may be controlled by said processing and controlling unit.

Further according to the invention, the configuration taken by said switching means may be controlled by an output of a comparator including a first input, connected to the amperometric transformer so as to receive a voltage signal proportional to the current passing into the IGBT, and a second input, at which a first threshold voltage value, preferably adjustable, is present.

Always according to the invention, said processing and controlling unit may be connected to first detecting means in such a way to receive a voltage signal related to the configuration taken by said switching means.

Preferably according to the invention, said switching means comprises a thyristor or SCR (Silicon Controlled Rectifier), the anode of which is connected to the IGBT gate.

Still according to the invention, the device may further comprise temperature sensor means, apt to detect the IGBT temperature, which is connected to said processing and controlling unit.

Further according to the invention, said processing and controlling unit may be apt to drive said ramp generating means in such a way that:
when the detected IGBT temperature is lower than a first temperature threshold value $T_1$, the duration of the ramp voltage signal is equal to a first interval $D_1$,
when the detected IGBT temperature is higher than the first temperature threshold value $T_1$, the duration of the ramp voltage signal is equal to a second interval $D_2$, where $D_2 < D_1$.

Preferably according to the invention, $D_1$ ranges from 450 to 550 microseconds and $D_2$ ranges from 150 and 250 microseconds.

Always according to the invention, said processing and controlling unit may be apt to drive said power down means in such a way that:
when the detected IGBT temperature is higher than a second temperature threshold value $T_2$, where $T_2 > T_1$, the IGBT is kept in off condition until the detected IGBT temperature is lower than a third temperature threshold value $T_3$, where $T_3 < T_2$, preferably with $T_3 < T_1$.

Still according to the invention, said processing and controlling unit may be connected to second detecting means in such a way to receive a voltage signal proportional to the voltage at the IGBT collector terminal.

Further according to the invention, the device may also comprise power supplying means connected to the mains and to said processing and controlling unit, so as to deliver to said processing and controlling unit at least one signal of synchronism with a supply periodic signal of the mains.

Always according to the invention, said supply periodic signal may be a sinusoidal signal and the device may be apt to apply to the load a reverse phase control, or RPC, waveform and/or a forward phase control, or FPC, waveform.

Moreover, thanks to the ramp generating means, to the power up means and to the power down means, the device according to the invention may drive the IGBT in such a way to apply to the load any power supply waveform.

Preferably according to the invention, said digital processing means includes a first microprocessor.

Still according to the invention, said digital processing means may be connected to a first communication interface unit in conformity with the DMX protocol.

Further according to the invention, said digital processing means may also be connected to a second communication interface unit in conformity with the CAN protocol.

Preferably according to the invention, said digital processing means includes a second microprocessor, intercommunicating with the first microprocessor and connected to the first communication interface unit and to the second communication interface unit.

It is further specific subject matter of this invention a system for controlling and regulating the power supply applied to a plurality of loads, each one of which is connected in series to a mains, the system comprising one electronic device, or dimmer, for each load of said plurality, for regulating the power supply applied to a load, the system further comprising a control central station connected to each one of said dimmers, for controlling the operation thereof, the system being characterised in that each dimmer is an electronic device for regulating the power supply applied to a load as previously described, which is mounted onto a supporting element of the corresponding load, and in that the system comprises a sole power supply cable, having a shunt for each one of the loads of said plurality.

Always according to the invention, the control central station may be apt to monitor the operation of each one of the dimmers regulating and controlling loads of said plurality.

Preferably according to the invention, said loads are lighting power devices.

BRIEF DESCRIPTION OF THE DRAWINGS

FIG. 2 depicts a system for controlling and regulating the power supply applied to a plurality of loads, according to another embodiment of the present invention.

DETAILED DESCRIPTION OF PREFERRED EMBODIMENTS

Figure 1:
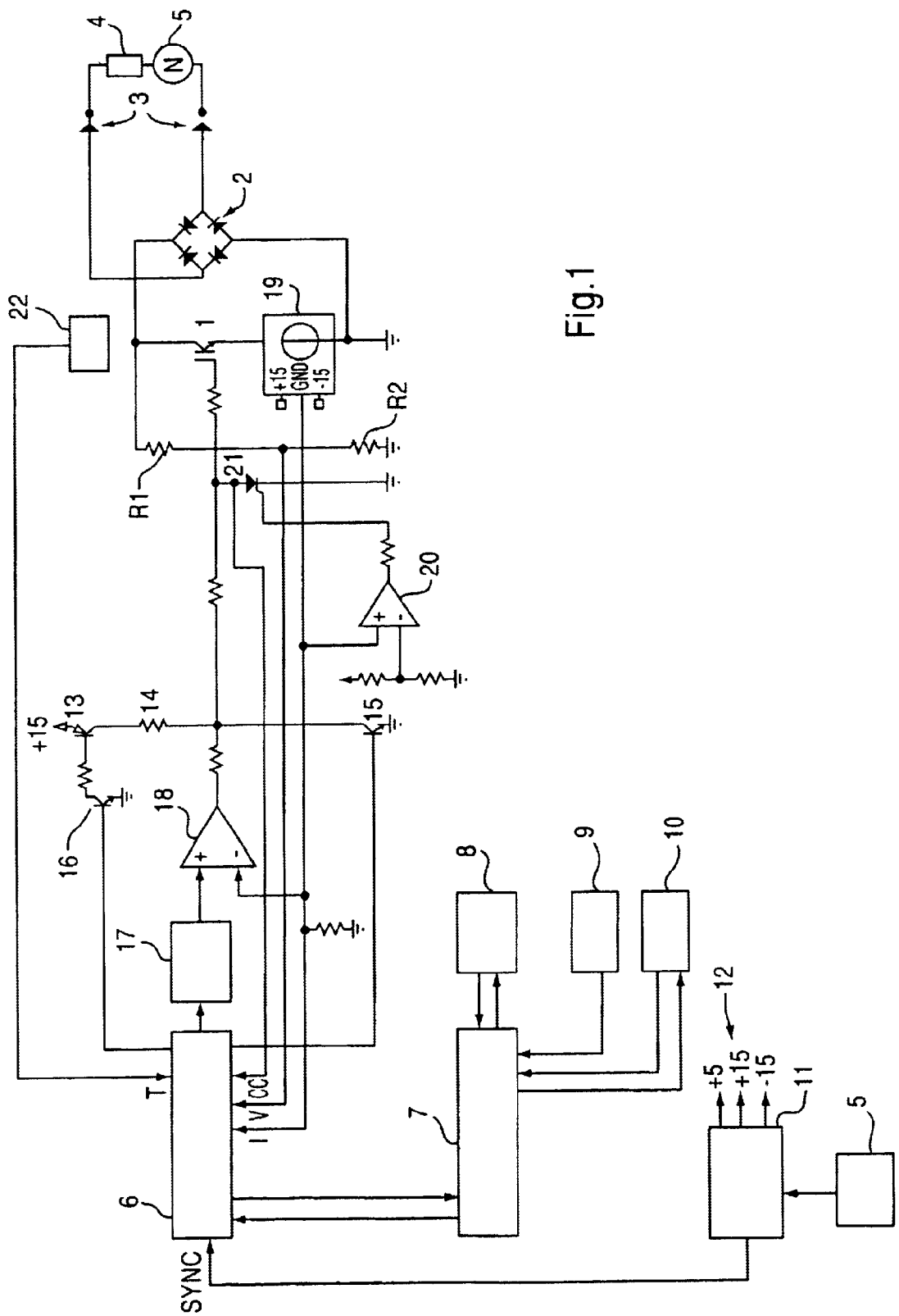
FIG. 1 depicts a dimmer, according to an embodiment of the present invention.

The present invention will now be described, by way of illustration and not by way of limitation, according to its preferred embodiment, by particularly referring to the Figures of the enclosed drawings, which show a circuit diagram of a preferred embodiment of the electronic device for regulating the power supply applied to a load according to the invention.

In the following, explicit reference will be made to the application of the electronic device according to the invention as dimmer, wherein it regulates the power supply applied to a load which comprises at least one lighting power device, such as a filament lamp. However, it has to be understood that the skilled persons may easily apply the electronic device according to the invention for regulating the power supply for different power loads, still remaining within the scope of protection of the present invention.

With reference to the Figure of the enclosed drawings, the basic component of the preferred embodiment of the dimmer according to the invention is an IGBT 1, apt to control the power supply delivered through a rectifier bridge 2 coupled to it. In particular, the load 4 and the power mains 5 are connected in series to the output terminals 3 of the rectifier bridge 2.

Dimmer control is carried out by a processing and controlling unit comprising a couple of microprocessors 6 and 7, respectively, communicating each other. The first microprocessor 6 controls the dimmer operation so as to activate IGBT 1 and to regulate the supply applied to the load 4. The second microprocessor 7 controls a display 8 and manages the communication with the outside by means of a first DMX interface unit 9 and of a second CAN interface unit 10.

The dimmer comprises a power supply 11 connected to the mains 5, from which it receives as input the power sinusoidal signal, and to the first microprocessor 6, to which it sends a signal of synchronism with the mains 5. The power supply 11 further delivers the voltage supply signals for the electronic components of the dimmer; in the preferred embodiment shown in the Figure such signals are three, equal to +5, +15 and −15 Volt, and they are schematically indicated by the reference number 12.

The gate of IGBT 1 is connected to the collector of a p-n-p transistor 13, through a resistor 14, and to the collector of a n-p-n transistor 15. The power up of transistors 13 and 15 generates the power up and the power down, respectively, of IGBT 1. The base of transistor 13 is driven by a second n-p-n transistor 16, the base of which is in turn driven by the first microprocessor 6. The base of transistor 15 is also connected to the first microprocessor 6, which drives its power up and power down. In this way, by means of transistors 13 and 15, resistor 14, and transistor 16, the first microprocessor 6 may power up and down IGBT 1, e.g., transistor 15 may be a power down means, and transistor 13, transistor 16, and resistor 14 may be a power up means.

The first microprocessor 6 is further connected to a ramp generating circuit apt to drive IGBT 1 in the linear region. Such ramp generating circuit comprises a Digital to Analogue (or D/A) converter 17, driven by the first microprocessor 6, the output of which is connected to the not inverting input of a differential amplifier 18. In particular, it is immediate for the skilled persons to arrange, along the connection between the output of the D/A converter 17 and the not inverting input of the differential amplifier 18, one or more stages for amplifying and/or stabilising the ramp signal coming from the D/A converter 17. The differential amplifier 18 receives at the inverting input a feedback voltage signal coming from an amperometric transformer 19, connected in series to IGBT 1 and traversed by the current of the load 4. The output of the differential amplifier 18 is connected to the gate of IGBT 1. When the IGBT 1 is driven by the differential amplifier 18, the current along the load 4 has the same shape of the output of the D/A converter 17. The amperometric transformer 19 is also connected to the first microprocessor 6, to which it sends the load current detecting signal.

The dimmer further includes a protection circuit comprising a comparator 20, the output of which drives the gate of a SCR 21 connected between the gate of the IGBT 1 and circuit ground. The comparator 20 compares the signal coming from the amperometric transformer 19 with a threshold value and, in case the load current exceeds a value corresponding to said threshold value, grounds the gate of the IGBT 1 through the SCR 21.

The dimmer also comprises a dissipator, not shown, on which a temperature sensor 22 is mounted, preferably very close to the IGBT 1, having its output connected to the first microprocessor 6.

Finally, the first microprocessor 6 receives as inputs also the SCR anode voltage and a voltage related to the instant value of the voltage on the IGBT 1. In particular, the first microprocessor 6 receives as input the voltage V taken from a voltage divider, e.g., a second detecting means, comprising a first resistor R1 and a second resistor R2, in which the voltage V is related to the instant value of the voltage on the collector of the IGBT 1.

As said before, the second microprocessor 7 manages the communication with the outside through DMX and CAN protocols.

The digital transmission DMX protocol (Standard DMX 512 USITT), which is widely used in the field of illumination engineering for shows, television, and events, has the characteristics to be unidirectional (half duplex).

The transmission-reception CAN protocol is generally employed in industry in automation environments having real-time control. Such protocol allows an external station not only to control the dimmer, but also to monitor the same in real time.

In order to better understand the present invention, the operating modes of the preferred embodiment of the dimmer shown in the Figure will be described in the following, similar modes being valid for other embodiments of the electronic device for regulating the power supply applied to a load according to the invention.

When the dimmer operates according to the RPC control, the first microprocessor 6 analyses the signal of synchronism with the mains 5 coming from the power supply 11. When the first microprocessor 6 detects a mains sinusoidal voltage zero-crossing, it powers up the IGBT 1 through p-n-p transistor 13, which keeps the gate of the IGBT 1 at +15 Volt; in this condition, D/A converter output is kept high.

When the IGBT power down phase begins, the p-n-p transistor 13 is turned off and the gate of the IGBT 1 is controlled by the differential amplifier 18. In this phase, the shape of the current applied to the load 4 is regulated by the first microprocessor 6, which drives, through the D/A converter 17, the IGBT 1 in linear region. The slope of power down front ramps is adapted to the current value, detected by the amperometric transformer 19, which flows through the IGBT 1 and the load 4 at the initial instant of power down, so as to keep the descent time as constant as possible, preferably equal to 500 microseconds.

In particular, the structure of the ramp generator may be easily changed in order to use a voltage feedback on the inverting input of the differential amplifier 18, instead of a current feedback.

When the dimmer operates according to the FPC control, the way of driving the IGBT 1 is similar. In particular, when the first microprocessor 6 detects a mains sinusoidal voltage zero-crossing, it turns off the p-n-p transistor 13 and keeps the output of the D/A converter 17 equal to the value of circuit ground; in these conditions, the IGBT 1 is off . When the phase of power up of the IGBT 1 begins, the IGBT gate is controlled by the differential amplifier 18 which drives IGBT 1 in linear region; in this phase, the rise shape of the current applied to the load 4 is regulated by the first microprocessor 6 through the D/A converter 17. The slope of power up front ramps may be adapted to the mains voltage value, so as to keep the rise time as constant as possible.

The dimmer according to the invention is capable to effectively manage overload situations which may occur, for instance, when a lamp having cold filament is connected, the resistance of which is about ten times lower than the one at operative temperature, in particular in case the lamp is of the maximum power allowed. Furthermore, the dimmer may manage accidental short circuit situations.

In fact, when the current delivered to the IGBT 1 and the load 4, detected by the amperometric transformer 19, exceeds a first predetermined current threshold value, the comparator 20 activates the SCR 21 grounding the gate of the IGBT 1. The comparator 20 and the SCR 21 assure a very fast power down of the IGBT 1 and grant protection in case of a short circuit.

Moreover, the first microprocessor 6 controls a second protection circuit comprising the n-p-n transistor 15, which intervenes in case the current delivered to the IGBT 1 exceeds a second current threshold value, lower than the first threshold value. In particular, in case the first microprocessor 6 recognises that the current detection signal coming from the amperometric transformer 19 has exceeded the second threshold value, it turns on the n-p-n transistor 15, grounding the gate of the IGBT 1 and turning it off. This last protection normally intervenes with cold lamps.

The dimmer according to the invention is further capable to recognise the presence of an inductive load 4, such as for example a fluorescent lamp, and to suitably and reliably modify the regulation of the power supply applied to the same. In fact, when the load 4 is inductive, the RPC control is inappropriate since voltage on IGBT 1 tends to increase; instead, the FPC control, together with a conduction extension for some milliseconds, assures a regular operation. Therefore, the first microprocessor 6 monitors voltage on IGBT 1 and, when this exceeds a predetermined threshold voltage value, automatically changes the dimmer operation mode from RPC control to FPC control.

Thanks to the temperature sensor 22, the dimmer according to the invention is also capable to grant a thermal protection for the IGBT 1. Assuming, for the sake of simplicity, the dimmer as operating according to the RPC control, the first microprocessor 6 analyses the signal coming from the sensor 22: when a first temperature threshold value is exceeded, the descent time of RPC power down fronts is reduced from 500 to 200 microseconds; when a second temperature threshold value is exceeded, the IGBT 1 is turned off and it is not turned on again until its temperature is lower than a third temperature threshold value, preferably lower than the first temperature threshold value. In any case, the first microprocessor 6 allows the decrease of descent time of RPC power down fronts to be proportional to the increase of IGBT temperature.

The advantages offered by the dimmer according to the invention appear evident.

In fact, the possibility to regulate the slope of current ramp of the RPC control power down fronts (and of the FPC control power up fronts) by means of the ramp generating circuit, in such a way that the IGBT 1 is driven by the differential amplifier 18 in linear region so that the current delivered to the load 4 has the same shape of the output of the D/A converter 17, assures great reliability and noiselessness of the dimmer: the slower the ramp, the more noiseless the dimmer. This makes possible to keep constant the descent (and rise) time of the power down (and power up) fronts, due to the control of the current feedback signal coming from the amperometric transformer 19.

Moreover, the slope of the ramps generated by the ramp generating circuit is adjustable in an extremely versatile way by means of the control of the first microprocessor 6, adapting such slope to different operating conditions of the dimmer.

Furthermore, the increase of dissipation on the IGBT 1, due to a possible ramp extension, is monitored by the temperature sensor 22 and effectively controlled by the first microprocessor 6.

The availability of both acoustically and electrically noiseless dimmers eliminates the present need of placing all the dimmers in a dedicated room, far and acoustically insulated from the show environment.

In particular, the availability of noiseless dimmers offers great advantages, since it is possible to mount them directly onto the light set suspension device.

First of all, this involves a harness simplification, greatly saving the quantity of cables and hence the cost of the related electrical installation. In particular, it is sufficient to have only one power supply cable and one cable of communication among a control station and all of the dimmers (each one of which is individually addressed by the central station). FIG. 2 shows such an exemplary system for controlling and regulating the power supply applied to a plurality of loads 4, each of which is connected in series to a mains 5. The system may comprise one dimmer D for each load 4 for regulating the cower supply applied to the load 4. The system also may comprise a control station CS connected to each one of the dimmers D, for controlling the operation thereof. Each dimmer D may be mounted onto a supporting element SE of the corresponding load 4. Moreover, the system may comprise a sole power supply cable SPC, having a shunt SH for each one of the loads 4, and one communication cable COM for allowing communication between the control station CS and each of the dimmers D. The elimination of long cable portions traversed by currents having a large harmonic contents go through the cable removes all the disturbances due to talks and interference among the dimmer circuits.

Moreover, a further cost saving is obtained by eliminating the need for dedicating a suitable separated room for the installation of dimmers.

The present invention has been described, by way of illustration and not by way of limitation, according to its preferred embodiments, but it should expressly be understood that those skilled in the art can make other variations and changes, without so departing from the related scope of protection, as defined by the following claims.

What is claimed is:

1. Electronic device, or dimmer, for regulating the power supply applied to a load, the device comprising an insulated gate bipolar transistor or IGBT, the IGBT having a first operating mode in which it is off and does not allow any current to pass, a second operating mode in which it is on and the current passing therein is substantially limited by characteristics of an external circuit connected to it, and a third linear region operating mode, in which the current passing therein is limited by a value proportional to the gate voltage, the IGBT being connected to a rectifier bridge, apt to be connected to a load and to a mains connected in series to each other, the device further comprising a digital processing means and ramp generating means driven by said digital processing means, apt to generate a ramp voltage signal at an output terminal connected to the IGBT gate, so as to drive the IGBT in linear region.

2. Device according to claim 1, characterised in that said ramp generating means comprises a Digital to Analogue (or D/A) converter, driven by said digital processing means, the D/A converter having an output connected to the not inverting input of a differential amplifier, the inverting input of which is connected to an amperometric transformer, in turn connected in series to the IGBT, the inverting input of the differential amplifier receiving from the amperometric transformer a voltage signal proportional to the current passing into the IGBT, an output of the differential amplifier being connected to the IGBT gate.

3. Device according to claim 2, characterised in that said ramp generating means comprises one or more stages for amplifying and/or establishing the signal generated at said output of the D/A converter.

4. Device according to claim 2 or 3, characterised in that said digital processing means is connected to the amperometric transformer in such a way to receive a voltage signal proportional to the current passing into the IGBT.

5. Device according to claim 1, characterized in that it includes power up means and power down means, controlled by said digital processing means, connected to the IGBT gate and apt to turn on and off, respectively, the IGBT.

6. Device according to claim 5, characterised in that said power up means includes a p-n-p transistor and said power down means includes a n-p-n transistor.

7. Device according to claim 1, characterised in that it comprises IGBT protection switching means, connected between the IGBT gate and the circuit ground, apt to take on an open configuration, in which the IGBT gate is apt to be driven by said ramp generating means, or a closed configuration, in which the IGBT gate is connected to the circuit ground.

8. Device according to claim 7, characterised in that the configuration taken by said switching means is controlled by said digital processing means.

9. Device according to claim 7, characterised in that the configuration taken by said switching means is controlled by an output of a comparator including a first input, connected to the amperometric transformer so as to receive a voltage signal proportional to the current passing into the IGBT, and a second input, at which a first threshold voltage value is present.

10. Device according to claim 9, characterised in that said first threshold voltage value is adjustable.

11. Device according to claim 9 or 10, characterised in that said digital processing means is connected to first detecting means in such a way to receive a voltage signal related to the configuration taken by said switching means.

12. Device according to anyone of the claims from 7 to 10, characterised in that said switching means comprises a thyristor or SCR (Silicon Controlled Rectifier), the anode of which is connected to the IGBT gate.

13. Device according to claim 1, characterised in that it further comprises temperature sensor means, apt to detect the IGBT temperature, which is connected to said digital processing means.

14. Device according to claim 13, characterised in that said digital processing means is apt to drive said ramp generating means in such a way that:

when the detected IGBT temperature is lower than a first temperature threshold value $T_1$, the duration of the ramp voltage signal is equal to a first interval $D_1$ when the detected IGBT temperature is higher than the first temperature threshold value $T_1$, the duration of the ramp voltage signal is equal to a second interval $D_2$, where $D_2 < D_1$.

15. Device according to claim 14, characterised in that $D_1$, ranges from 450 to 550 microseconds and $D_2$ ranges from 150 and 250 microseconds.

16. Device according to claim 14 or 15, characterized in that said digital processing means is apt to drive said power down means in such a way that: when the detected IGBT temperature is higher than a second temperature threshold value $T_2$, where $T_2<T_1$, the IGBT is kept in off condition until the detected IGBT temperature is lower than a third temperature threshold value $T_3$, where $T_3<T_2$.

17. Device according to claim 16, characterised in that the third temperature threshold value $T_3$ is lower than the first temperature threshold value $T_1$, i.e. $T_3<T_1$.

18. Device according to claim 1, characterized in that said digital processing means is connected to second detecting means in such a way to receive a voltage signal proportional to the voltage at the IGBT collector terminal.

19. Device according to claim 1, characterized in that it further comprises power supplying means connected to the mains and to said digital processing means, so as to deliver to said digital processing means at least one signal or synchronism with a supply periodic signal of the mains.

20. Device according to claim 19, characterized in that said supply periodic signal is a sinusoidal signal and in that the device is apt to apply to the load a reverse phase control, or RPC, waveform and/or a forward phase control, or FPC, waveform.

21. Device according to claim 1, characterized in that said digital processing means includes a first microprocessor.

22. Device according to claim 21, characterized in that said digital processing means is connected to a first communication interface unit in conformity with the DMX protocol.

23. Device according to claim 22, characterised in that said digital processing means is further connected to a second communication interface unit in conformity with the CAN protocol.

24. Device according to one of claim 22 or 23, characterized in that said digital processing means includes a second microprocessor, intercommunicating with the first microprocessor and connected to the first communication interface unit and to the second communication interface unit.

25. Device for controlling and regulating the power supply applied to a plurality of loads, each one of which is connected in series to a mains, the device comprising one electronic device, or dimmer, for each load of said plurality, for regulating the power supply applied to the load, the system further comprising a control central station connected to each one of said dimmers, for controlling the operation thereof, the system being characterized in that each dimmer is the electronic device for regulating the power supply applied to the load according to claim 22, which is mounted onto a supporting element of the corresponding load, and in that the device comprises a sole power supply cable, having a shunt for each one of the loads of said plurality.

26. Device according to claim 25, characterized in that the digital processing means of each dimmer is connected to a second communication interface unit in conformity with the CAN protocol, and in that the control central station is apt to monitor the operation of each one of the dimmers regulating and controlling loads of said plurality.

27. Device according to claim 25 or 26, characterised in that said loads are lighting power devices.

28. An electronic device for regulating power applied to a load, the device comprising:
   an insulated gate bipolar transistor ("IGBT") coupled to a rectifier bridge, wherein the rectifier bridge is configured to be coupled to the load;
   at least one processor;
   a digital to analog ("D/A") converter coupled to the at least one processor;
   a differential amplifier coupled to a gate of the IGBT, wherein the differential amplifier comprises a non-inverting input and an inverting input, and the output of the D/A converter is coupled to the non-inverting input of the differential amplifier; and
   an amperometric transformer coupled to each of the IGBT and the inverting input of the differential amplifier, wherein the amperometric transformer is configured to transmit a voltage signal proportional to the current passing into the IGBT to the differential amplifier.

29. An electronic device for regulating power applied to a load, the device comprising:
   an insulated gate bipolar transistor ("IGBT") configured to operate in a first operating mode in which the IGBT is off and prevents current from passing therethrough; to operate in a second operating mode in which the IGBT is on and the current passing therein is substantially limited by characteristics of an external circuit coupled to the IGBT, and to operate in a third operating mode in which the current passing therein is limited by a value proportional to a gate voltage of the IGBT, wherein the IGBT is coupled to a rectifier bridge, and the rectifier bridge is configured to be coupled to the load;
   at least one processor;
   a digital to analog ("D/A") converter coupled to the at least one processor;
   a differential amplifier coupled to a gate of the IGBT, wherein the differential amplifier comprises a non-inverting input and an inverting input, and the output of the D/A converter is coupled to the non-inverting input of the differential amplifier; and
   an amperometric transformer coupled to each of the IGBT and the inverting input of the differential amplifier, wherein the amperometric transformer is configured to transmit a voltage signal proportional to the current passing into the IGBT to the differential amplifier.

30. An electronic device for regulating the power supply applied to a load, the device comprising an insulated gate bipolar transistor or IGBT, the IGBT having a first operating mode in which it is off and does not allow any current to pass, a second operating mode in which it is on and the current passing therein is substantially limited by characteristics of an external circuit connected to it, and a third linear region operating mode, in which the current passing therein is limited by a value proportional to the gate voltage, the IGBT being connected to a rectifier bridge, apt to be connected to a load and to a mains connected in series to each other, the device further comprising a digital processing means and ramp generating means driven by said digital processing means, apt to generate a ramp voltage signal at an output terminal connected to the IGBT gate, so as to drive the IGBT in linear region, wherein said ramp generating means comprises a Digital to Analogue ("D/A") converter driven by said digital processing means, the D/A converter having an output connected to the not inverting input of a differential amplifier, the inverting input of which is connected to an amperometric transformer, in turn connected in series to the IGBT, the inverting input of the differential amplifier receiving from the amperometric transformer a voltage signal proportional to the current passing into the IGBT, an output of the differential amplifier being connected to the IGBT gate.

31. The device according to claim 1, characterised in that said digital processing means controls a display means.

* * * * *